March 12, 1935.  J. G. THOMAS  1,994,055
TREATMENT OF LIQUIDS AND APPARATUS
Filed Nov. 23, 1932  3 Sheets-Sheet 1
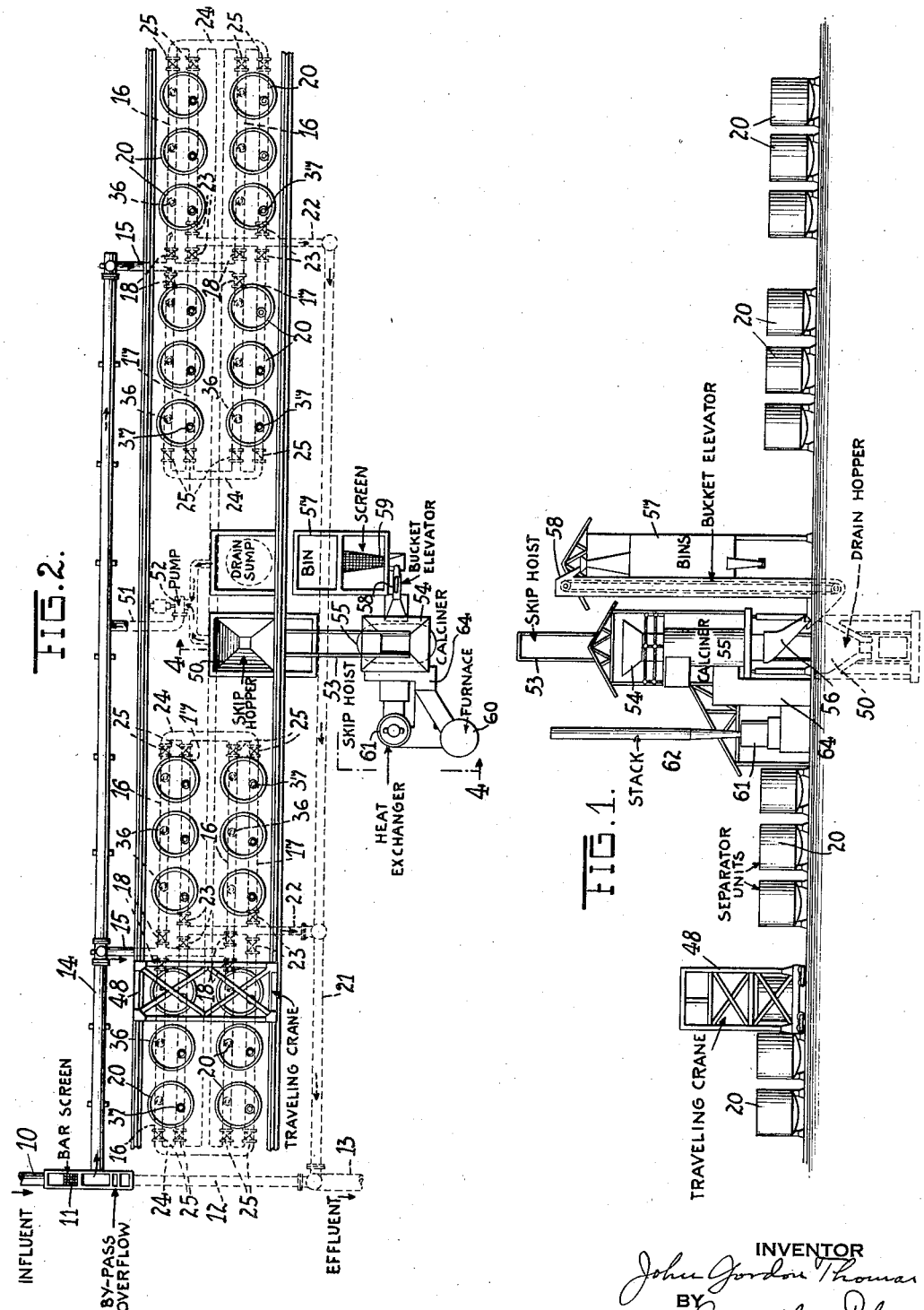

March 12, 1935.  J. G. THOMAS  1,994,055
TREATMENT OF LIQUIDS AND APPARATUS
Filed Nov. 23, 1932   3 Sheets-Sheet 2

INVENTOR
John Gordon Thomas
BY
ATTORNEYS

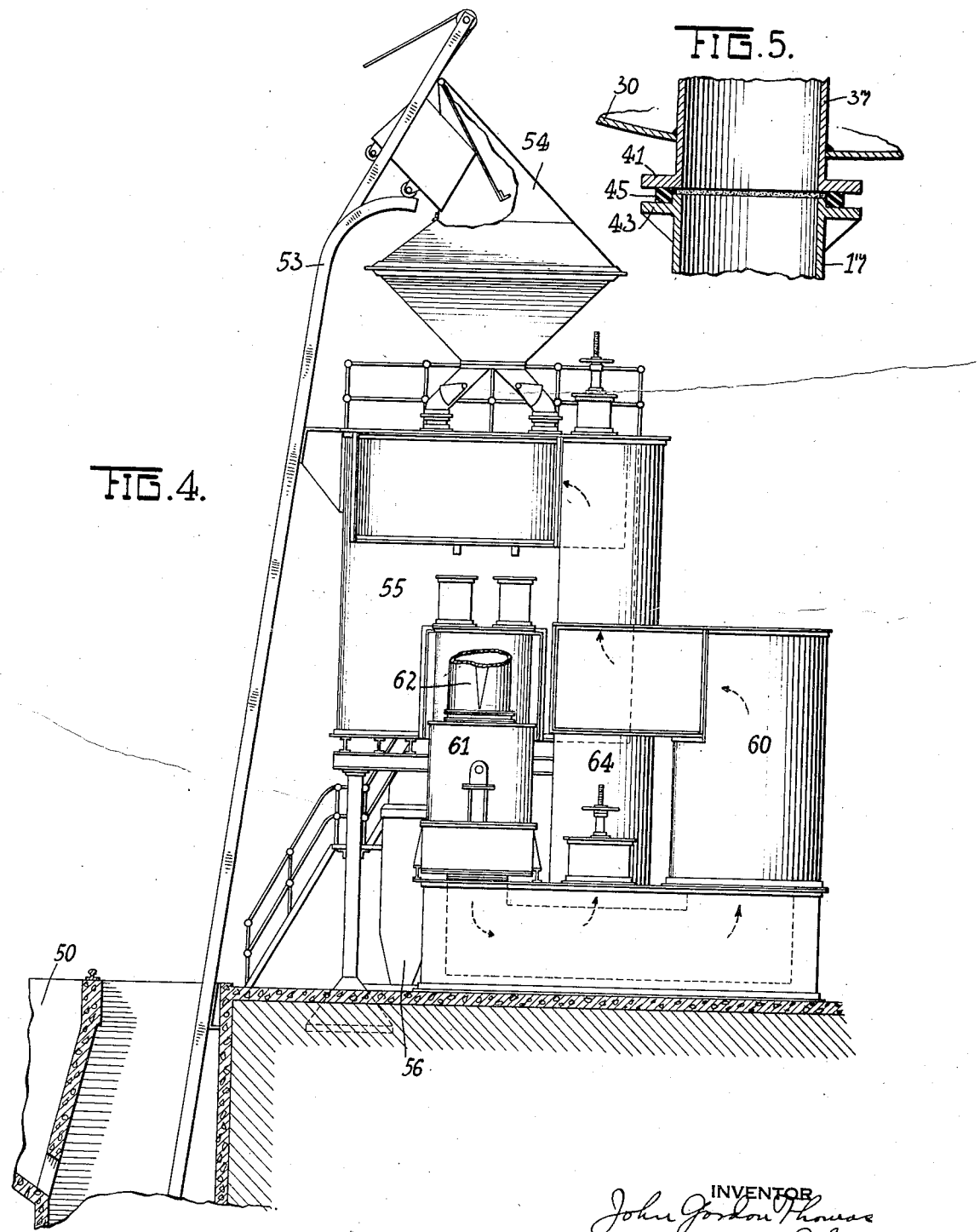

Patented Mar. 12, 1935

1,994,055

UNITED STATES PATENT OFFICE 1,994,055

TREATMENT OF LIQUIDS AND APPARATUS

John Gordon Thomas, New York, N. Y.

Application November 23, 1932, Serial No. 643,971

7 Claims. (Cl. 210—2)

This invention relates to purification of liquids, and more particularly to the separation and disposal of finely divided matter entrained in liquids such, for example, as sewage, trade wastes, and the like.

The treatment of sewage and like liquids has for many years presented a pressing and difficult problem. The rapid concentration of population in urban centers has led to an equally rapid rise in the value of property so that the land required for sewage-treating plants would involve so great an expense as to render prohibitive the use of methods which otherwise would be quite satisfactory. The problem is further complicated by the fact that most methods of treating sewage are attended by some degree of nuisance, particularly objectionable odors, filter flies, etc.

It is an object of the present invention, therefore, to provide a method of treating sewage and other liquids which will be entirely free from nuisance of any kind and which may be carried out at small operating expense in a plant of very small area.

The invention is based upon the discovery that with proper conditions and procedure a purification comparable with the best purification obtained by other methods can be obtained by passing the liquid through a bed of material which serves as a separator and which material is present in the form of pieces of a size and shape adapted to leave large interstices between them. Such a bed may be substantially similar to those which have been used as contact beds or in trickling filters, but in the present process the bed may be completely submerged in the liquid and the stream of the liquid, of substantial velocity, may be continuously passed therethrough so that, as compared with the use of such beds in contact and trickling filter processes, the capacity is increased many fold. Furthermore, according to the present invention, the separator material may be replaced from time to time before the deposited matter has had an opportunity to decompose and before there is any opportunity for the growth of filter flies or other insect nuisances. The material of the separator beds, therefore, serves as a carrier upon which the finely divided matter of the sewage, etc. is deposited and upon which it may be carried into a furnace or other disposal apparatus where it is burned or otherwise cleaned from the carrier pieces. The carrier material when thus cleaned or purged may be used again to replace the material which is subsequently removed from the separator.

In the accompanying drawings, I have illustrated the preferred embodiment of my invention. This is given merely by way of example and to assist in the explanation of the principle and operation of the invention. It is not to be taken as limiting in any sense.

Figure 1 is a diagrammatic elevation of a plan design for the treatment of sewage;

Figure 2 is a diagrammatic plan view of the plant illustrated in Figure 1;

Figure 4 is a view in elevation of a part of the disposal apparatus taken on the line 4—4 of Figure 2, and Figure 5 is a detail view in vertical section taken on the line 5—5 of Figure 3.

Figure 3:
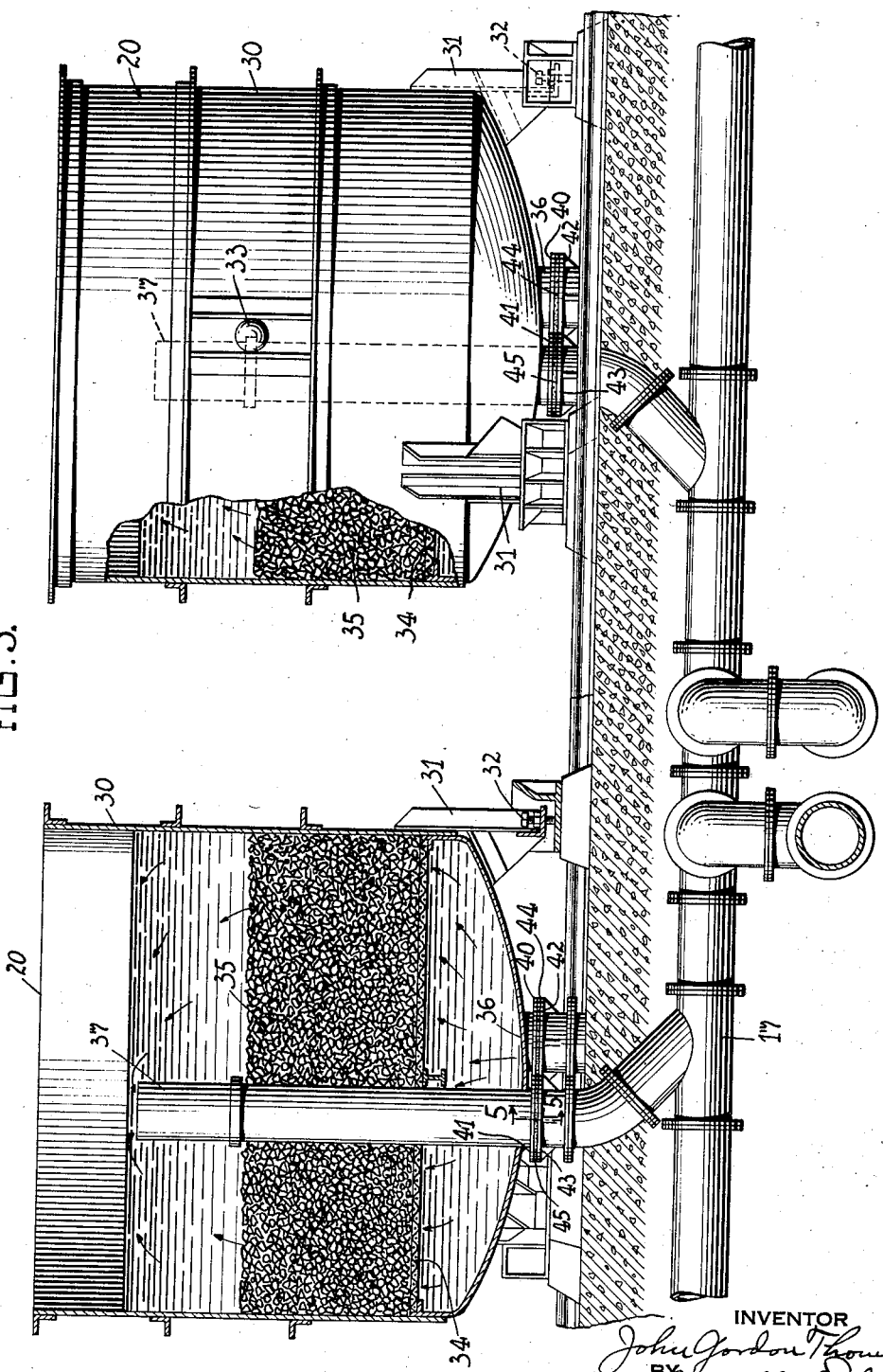
Figure 3 is a detail view in vertical section of one of the separator units of the apparatus shown in Figures 1 and 2.

In the plant as laid out in Figures 1 and 2, the sewage or other raw liquid enters through an influent conduit 10. This may pass initially through a bar screen 11. Any large pieces may be separated from the stream. An overflow bypass 12 may be provided to the effluent conduit 13 but under normal operating conditions the raw liquid will pass from the bar screen 11 through a main 14 to the headers 15. These headers 15 are connected to one of each of the pairs of manifolds 16—17, and by means of valves 18 the influent may be allowed to flow through any of the manifolds 16 in to the separator units 20. The effluent main 21 connects the header 22 with the effluent conduit 13 and by means of valves 23 any group of the separator units 20 may be connected thereto through manifolds 17, or may be cut off therefrom.

The headers 24 and the valves 25 interconnect the various manifolds 16—17 of each group. Thus the influent may be allowed to flow into the separator units 20 grouped along any manifold 16 and the effluent from that group of cells may be drawn from the manifold 17 through the header 24 to the manifold 16 of another group. In some cases it may be desirable to provide additional headers 24 so that the liquid may be caused to flow successively through more than two groups of separator units. By suitable control of the valves 18, 23 and 25, any group of separator units 20 may be made to serve as the primary group which receives the influent, and the parallel group may be made to serve as the secondary units which receive the effluent from the primary units.

In Figure 3 I have shown in greater detail one of the units 20. As there shown, this consists of a tank 30 having legs 31 adjustable by means of set screws or bolts 32 and trunnions or studs 33 to assist in removal and renewal of the separator masses.

Within the tank 30 is a grate or perforated false bottom 34 upon which is supported a filter mass 35 which may consist of any material which is resistant to the conditions of the use in pieces of a size and shape adapted to leave numerous interstices throughout the mass for the free flow of liquid therethrough. I have found that for this purpose e. g. honeycomb slag in pieces of a size between ½" and 3" is most satisfactory. Numerous other materials may be used, however, including crushed stone, coke, irregular metallic pieces, etc.

An inlet 36 and an outlet 37 is provided through the bottom, the former preferably extending only to the bottom, as shown in Figure 3, while the outlet preferably stands up for a substantial distance above the separator mass 35. Thus a substantial pool of the liquid is maintained both above and below the separator mass and thus such cross flows as are essential to permit the liquid to spread laterally from the inlet and toward the outlet will occur in open settling spaces and the general direction of flow through the separator mass will be uniformly upward.

These separator units 20 are preferably connected to the manifolds 16 and 17 by gravity so that they may be removed for dumping the separator mass therefrom without any need for any separate operation to release the unit from its connections. For this purpose, the inlet 36 and the outlet 37 are provided with flanges 40 and 41 and the manifolds 16 and 17 are provided with corresponding flanges 42 and 43. Between these, as shown, may be compressible packing rings 44 and 45 which serve to provide a water-tight seal under the pressure due to the weight of the tank. The extent of the compression of these rings 44 and 45 may be regulated by adjustment of the bolts 32.

A crane, e. g., a gantry crane 48, is advantageously provided over the rows of separator units 20 so that any unit may be lifted from its mounting and carried to the drainage hopper 50 of the disposal plant.

A return line 51 is provided from a sump beneath the drainage hopper to the influent main 14 and if the level of this sump is too low to cause flow by gravity, a pump 52 should be provided.

From the drainage hopper 50, the fouled carrier material is raised, e. g., by means of a skip hoist 53, to the hopper 54 of a calcining furnace 55 which advantageously is a vertical shaft furnace. The passage of the carrier material with the deposited matter thereon from the top through the drying and calciner zones is advantageously regulated by means of rotary grates (not shown) at the bottom of the shaft, and the carrier material discharged from the calciner is collected in a hopper 56 from which it may be removed from time to time and raised into bins 57 by means of bucket conveyors or other type hoist 58. From these bins 57 the regenerated carrier material is drawn as required for refilling the separator units 20. Preferably, the discharge from the hoist 58 into the bin 57 is over a bar screen 59 in which the dust and finely divided material which may have been formed by the handling and calcining will be separated from the larger pieces which are suitable for free use in the separators.

The calcining furnace is also provided with a preheating furnace 60 and a heat exchanger 61, e. g., of the conventional air preheater economizer type. The hot gases which are drawn from the bottom of the calcining furnace 55 pass through the heat exchanger 61 to the stack 62. Fresh air is drawn counter-current through the heat exchanger 61 so that the heat from the waste gases before they enter the stack 62 is transferred to the fresh air which is drawn through the preheater. The air which has been initially heated in the preheater 61 may be further heated by passage through the furnace 60, or may be bypassed through the conduit 64 directly to the top or drying zone of the calciner 55. Ordinarily, it will be desirable to pass a part of the preheated air through the furnace 60 and a part through the bypass conduit 64. In any case, the heat contained in the gases which enter the drying zone of the calciner should be sufficient to maintain the required temperature in the calcining zone and to counteract the cooling effect which results from the evaporation of water in the drying zone.

In the preferred use of the apparatus as just described, the influent passes first through the bar screen 11, through main 14 and the header 15, to the first pair of manifolds 16 of each block of separator units, that is, as shown in Figure 2, to the upper manifolds 16 on both sides of the disposal plant. From the headers 15 the influent passes into the bottom of each of the twelve tanks 30 of the upper row, as shown in Figure 2. In the open space at the bottom of the tank, the influent spreads out and then passes upwardly, through the grate 34 and the mass of carrier material 35, into the open space at the top of the tank 30. At the top of this open space the effluent from each tank overflows into the outlet 37 and through it into the manifold 17. The valves 23 of the manifolds 17, which are shown at the top of Figure 2, are closed, while the valves 25 of the same manifolds are open. Similarly, with the manifold 16 of the lower row of separator units, as shown in Figure 2, the valves 25 are open and the valves 18 are closed. Thus the effluent from the first groups of separator units flows into the second group through manifolds 16 and the inlets 36. In the same way, the liquid passes up through the mass of carrier material in each of these units and overflow through the outlet 37 into the manifolds 17, as shown in Figure 2. The valves 25 of these manifolds 17 are closed, while the valves 23 are open so that the effluent from these separator units passes through the header 22 into the main 21 and the effluent outlet 13.

During the daylight hours, that is, when the flow of sewage is near the maximum, all of the separator units may be used, as just described. As the time of day approaches, however, when the minimum flow is to be expected, one of the groups may be cut off, for example, by closing the valves 18 on one side of the headers 15. The separator masses 35 in the tanks 30 of this group will then be allowed to drain for a few minutes, after which the crane 48 will pick up each of the tanks, carry it to the hopper 50, and dump its contents and then carry it to the slag bin 57, where it will be re-filled with fresh carrier material and finally returned to its position over the manifolds 16 and 17. When the three tanks on one pair of manifolds 16—17 have thus been dumped and re-filled, the valves 18, 23 and 25 are adjusted so as to reverse the flow. That is to say, instead of flowing first into the manifold 16 at the top of Fig. 2, the flow will be from the header 15 into the manifold 16 shown at the bottom of Fig. 2, and thence through the lower group of separator units to the manifold 17, through the header 24 to the upper manifold 16, through the upper group of separator units to the manifold 17, and thence out through the header 22.

Ordinarily it will not be necessary to change the separator units of more than one group at a time, but obviously that will depend upon the frequency and upon the concentration of the suspended matter which is entrained in the sewage and in some cases it may be desirable to change half of the units at one time. That is to say, as soon as the three units of one group have been changed they may be brought back into the stream by adjustment of the valves 18, 23 and 25 and the next group may then be cut off by adjustment of its valves 18 and 23 and thus three units of each group may be renewed.

As will be evident from what has been said above, the influent enters first through one group of separator units and then through another and, advantageously, the influent always enters the group which contains the freshest carrier material and receives its final treatment in the group upon which a relatively heavy deposit has already been formed. Although this seems contrary to usual practice and would be expected to produce contamination of the liquid already purified in the first group, it has been found in practice that a more complete purification can be obtained in this way than if the flow is first through the material having the heaviest deposit and later through the relatively clean material.

Obviously, the separator units may be arranged so that the liquid may flow through more than two groups of the units and in this way a somewhat higher degree of purification may be obtained. It has been found in practice, however, that under ordinary conditions the additional separation which is attained by increasing the number of units in series beyond that shown in the drawings will not be such as to justify the additional expense.

The degree of separation which may be effected is dependent upon the depth of the bed in the separator units, the number of units in series and the rate of flow. Using an arrangement as shown in the drawings and a separator mass about three feet deep in each unit and a flow in each tank equivalent to 110 million gallons per day per acre I have found to give excellent purification. With such a plant an overload up to 160 million gallons each acre day can be tolerated without serious deterioration of the effluent and much higher overloads can be accommodated with fair purification. Ordinarily, however, the flow should not exceed 110 million gallons per acre per day.

Operating as above described, I have found that a deposit of sludge equal to 8% on a dry basis can readily be obtained on the carrier material, and this is of great importance from an economical standpoint. Furthermore, since this sludge is fresh and undecomposed and is held in the openwork structure of the separator mass, it drains freely leaving much less water to evaporate than would be necessary if the sludge were stale or were in a dense form.

The material which has been dumped from the tanks 20 into the drainage hopper 50 still contains a moderate proportion of moisture and a certain amount of this, carrying with it a small proportion of the deposited solids, will drain from the carrier material in this hopper. Because of the contamination of this liquid it would, of course, be objectionable to allow the drainage to enter the effluent and it is, therefore, pumped back into the influent so that its entrained solids may be again separated from the liquids in its passage through the separator units.

The moist material from the drainage hopper 50 is fed into the top of the calciner furnace 55 and as it passes by gravity through the shaft from top to bottom, it passes through the stream of hot gases from the preheater 61 and the furnace 60. These gases enter the top of the shaft where the material still contains a proportion of moisture and thus are substantially cooled before the material is dried. As a result, there is less tendency to form decomposition products which would produce objectionable odors. However, even when such odors are formed in the drying part of the calciner, they will be destroyed and absorbed in the lower part of the calciner where the gas is passed successively through the combustion zone and into the cooler mass of purged carrier material and finally through the heat exchanger before passing out into the atmosphere. It has been found that with this procedure the production of odors is practically insignificant and that the gases may be discharged through a stack, as shown, without danger of producing any objectionable nuisance.

Although I have shown and described above a preferred embodiment of my invention, it is to be understood that this is only by way of illustration and that many changes and modifications may be made without departing from the spirit of my invention. Thus, for example, although I have shown the separator units of each series placed side by side, it is entirely possible, and in many cases practicable, to place them one above the other, moving them downwardly in a tower as successive ones are refilled, or merely shifting the connections, as described above, so as to shift the separator units relative to the stream without actually altering their position relative to each other or to their supporting means.

The invention, although the embodiment illustrated and described above is primarily intended for use as a complete and independent sewage treating plant, is also extremely advantageous for use in connection with other methods as, for example, in connection with the activated sludge process. In such case, instead of providing settling tanks, great economy in space may be effected by utilizing separators of the type herein described and, furthermore, the sludge may in this way readily be disposed of at much less expense than in the case of the activated sludge process as heretofore practiced.

The process of this invention may be combined also with a chemical coagulation treatment, but in such case I have found it preferable to allow a half hour settling period after the chemical (e. g. iron, or aluminum salts and especially the sulfates and chlorides) has been thoroughly mixed into the liquid before it is passed through the separator mass. I have also found that it is advantageous to introduce this chemical treatment between the treatments in the several separator units of the series.

Although I have described my novel process and apparatus particularly in connection with separators using masses of carrier pieces adapted to leave large interstices therebetween, many of the features of my invention are applicable also to filters of more conventional type in which the bed is designed to provide interstices of capillary dimensions and it will be understood that many of the novel parts and features of the invention may be used apart from the entire system as herein described.

What is claimed as new is:

1. The method of treating sewage and other liquids carrying finely divided combustible matter entrained therein, which comprises passing the liquid successively through a series of separator masses each composed of pieces of a refractory carrier material of a size and shape adapted to leave large interstices therebetween for the free flow of liquid or gases therethrough, and each having open space above and below said mass in which spaces the liquid may spread and cross-flow from the inlet and to the outlet, and whereby cross-flow within said separator mass may be avoided, successively removing said masses as relatively heavy deposits form upon the carrier pieces of each and replacing each by a fresh one, diverting the flow of liquid through the series after each replacement so that the stream enters in the freshest mass and flows successively through the others in the order of increasing degree of deposit, draining excess liquid from the mass thus removed, drying the mass by passing a stream of drying gases through the interstices of the mass, burning the dried deposited matter by passing preheated oxidizing gases through the interstices, and returning the residual carrier pieces for reuse in fresh separator masses.

2. The method of treating sewage and other liquids carrying finely divided matter entrained therein, which comprises passing the liquid successively through a series of separator masses each composed of pieces of a carrier material of size and shape adapted to leave large interstices therebetween for the free flow of liquids therethrough, and each having open space above and below said mass in which space the liquid may spread and cross flow from the inlet and to the outlet whereby a uniform upward flow may be maintained within the mass, successively removing said masses from the series as relatively heavy deposits are formed upon the carrier pieces of each, replacing each by a fresh mass of carrier material, and diverting the flow of the liquid so that it passes through the series progressively from the cleanest carrier mass to that with the heaviest deposit.

3. The method of treating sewage and other liquid carrying finely divided matter entrained therein, which comprises passing said liquid through a separator mass composed of pieces of carrier material of size and shape adapted to leave relatively large open interstices therein, progressively renewing said separator mass by adding fresh carrier material to one end thereof relative to the flow of the liquid and removing from the opposite end thereof material carrying a relatively heavy deposit of the finely divided material, the liquid being passed first through the relatively fresh material and finally through the material upon which a relatively heavy deposit is already formed.

4. The method of treating sewage and other liquids carrying finely divided matter entrained therein, which comprises passing said liquid through a mass of separator material in pieces of size and shape adapted to leave interstices therebetween, continuing the passage of said liquid therethrough until a substantial deposit of the finely divided matter has formed thereon, thereafter, and before the interstices of the mass have become objectionably clogged by the deposited matter, introducing a fresh mass of separator material into the stream of liquid so that the stream passes first through the fresh material and then through the material on which a deposit has already formed, and thereafter, as the deposit upon said first named mass becomes heavier so as to interfere with the desired flow of the liquid therethrough, removing said mass from the path of the stream of liquid.

5. An apparatus for treating sewage and other liquids carrying finely divided combustible matter entrained therein, which comprises a plurality of pairs of liquid conduits having paired openings, one opening of each pair being on each conduit, an inlet header by which said liquid may be fed to said conduits of each pair, an outlet header by which liquid may be carried off from the other conduit of each pair, valved connections between said headers and said conduits, cross conduits by which the outlet conduit of one pair may be connected to the inlet conduit of another pair, valved connections between said cross conduits and the paired conduits, separator tanks each having a mass of carrier material in pieces of size and shape adapted to leave large open interstices through which the liquid may flow freely, and a grating above the bottom of said tank whereby said mass is supported above an open inlet space and below an open outlet space, and having inlet and outlet connections opening into said spaces respectively and adapted to engage one of said pairs of openings so as to receive liquid from one conduit of a pair and discharge liquid to the other, means for removing the carrier material from any tank, means for draining the carrier and deposited matter removed from the separator tanks, a conduit for returning the drainage to the inlet so that it will again pass through the separators, means for drying and burning the deposited matter on the surfaces of the carrier, means for feeding the carrier with its deposited matter from the draining means to the burning means, and means for supplying preheated oxidizing gases to said burning means.

6. An apparatus as defined in claim 5, in which the tanks engage about the paired openings by means of a compressible packing held compressed by the weight of the tanks and the means for removing carrier material comprises means for lifting the tank bodily from said gravity connections and dumping its contents.

7. In an apparatus adapted for treating liquids, a tank having a restricted opening at the bottom thereof, a conduit having an end opening into the opening from said tank, a compressible packing around said opening between the tank and said conduit and compressed therebetween by at least a part of the weight of said tank thereon, means for holding the tank in said relation to the end of the conduit while said tank remains unsecured to the conduit or to the positioning means, and means adapted to hold a part of the weight of the tank when in said position whereby the unsupported weight of the tank serves to compress the packing while the packing is relieved from a desired portion of the full weight of the tank.

JOHN GORDON THOMAS.